US008392048B2

(12) United States Patent
Colarelli, III et al.

(10) Patent No.: US 8,392,048 B2
(45) Date of Patent: Mar. 5, 2013

(54) INTEGRATED TIRE PRESSURE DIAGNOSTIC SYSTEM AND METHOD

(75) Inventors: Nicholas J. Colarelli, III, St. Louis, MO (US); Timothy A. Strege, Sunset Hills, MO (US)

(73) Assignee: Hunter Engineering Company, St. Louis, MO (US)

( * ) Notice: Subject to any disclaimer, the term of this patent is extended or adjusted under 35 U.S.C. 154(b) by 843 days.

(21) Appl. No.: 11/947,144

(22) Filed: Nov. 29, 2007

(65) Prior Publication Data

US 2008/0133081 A1 Jun. 5, 2008

Related U.S. Application Data

(60) Provisional application No. 60/867,938, filed on Nov. 30, 2006.

(51) Int. Cl.
*G01M 17/00* (2006.01)

(52) U.S. Cl. ........... 701/29.1; 701/29.9; 701/30.5; 701/31.4; 340/442; 73/146.2; 73/146.8; 700/279

(58) Field of Classification Search ........... 701/29, 701/31, 33–35; 340/442, 445–448; 73/146, 73/146.2–146.5, 146.8; 700/279; 702/104
See application file for complete search history.

(56) References Cited

U.S. PATENT DOCUMENTS

| | | | | |
|---|---|---|---|---|
| 4,602,127 A * | 7/1986 | Neely et al. | ............. | 379/68 |
| 4,738,133 A * | 4/1988 | Breckel et al. | ............. | 73/114.58 |
| 5,519,488 A * | 5/1996 | Dale et al. | ............. | 356/139.09 |
| 5,600,301 A * | 2/1997 | Robinson, III | ............. | 340/442 |
| 6,148,888 A * | 11/2000 | Loureiro Benimeli | ....... | 152/415 |
| 6,275,148 B1 * | 8/2001 | Takamura et al. | ............. | 340/442 |
| 6,293,147 B1 | 9/2001 | Parker et al. | | |
| 6,441,732 B1 * | 8/2002 | Laitsaari et al. | ............. | 340/539.1 |
| 6,502,018 B1 * | 12/2002 | Bessler | ............. | 701/29 |
| 6,594,602 B1 * | 7/2003 | Schultz | ............. | 702/104 |
| 6,711,955 B1 * | 3/2004 | Wilkerson, Jr. | ............. | 73/708 |
| 6,754,562 B2 * | 6/2004 | Strege et al. | ............. | 700/279 |
| 6,775,632 B1 * | 8/2004 | Pollack et al. | ............. | 702/104 |
| 6,822,582 B2 | 11/2004 | Voeller et al. | | |
| 6,825,758 B1 * | 11/2004 | Laitsaari | ............. | 340/442 |
| 6,917,417 B2 * | 7/2005 | Strege et al. | ............. | 356/139.09 |
| 6,982,653 B2 | 1/2006 | Voeller et al. | | |
| 7,043,396 B2 * | 5/2006 | Larson et al. | ............. | 702/151 |
| 7,218,209 B2 * | 5/2007 | Utter et al. | ............. | 340/447 |
| 7,237,433 B2 * | 7/2007 | Walenty et al. | ............. | 73/146.5 |
| 7,250,852 B1 * | 7/2007 | Kell | ............. | 340/447 |
| 7,289,930 B2 * | 10/2007 | Stolzl et al. | ............. | 702/148 |
| 7,323,975 B2 * | 1/2008 | Hall et al. | ............. | 340/442 |
| 7,503,210 B2 * | 3/2009 | Lauer et al. | ............. | 73/146.5 |
| 7,706,930 B2 * | 4/2010 | Corniot | ............. | 701/1 |
| 2005/0171662 A1 * | 8/2005 | Strege et al. | ............. | 701/33 |
| 2006/0169414 A1 | 8/2006 | Hillman et al. | | |

OTHER PUBLICATIONS

Grygier et al., "An Evaluation of Existing Tire Pressure Monitoring Systems" Report No. DOT 809 297, Jul. 2001, National Highway Traffic Safety Administration (NHTSA), US Department of Transportation, all pages.*

* cited by examiner

*Primary Examiner* — Thomas Black
*Assistant Examiner* — Luke Huynh
(74) *Attorney, Agent, or Firm* — Polster, Lieder, Woodruff & Lucchesi, L.C.

(57) ABSTRACT

A computer-based vehicle service system, such as a wheel alignment system, is configured with a tire pressure monitoring system interface to acquire measurements of the air pressure directly from tire pressure monitoring system sensor installed in the tires of a vehicle undergoing a service procedure. The vehicle service system is further configured to utilize the acquired air pressure measurements to complete at least one vehicle diagnostic procedure.

15 Claims, 4 Drawing Sheets

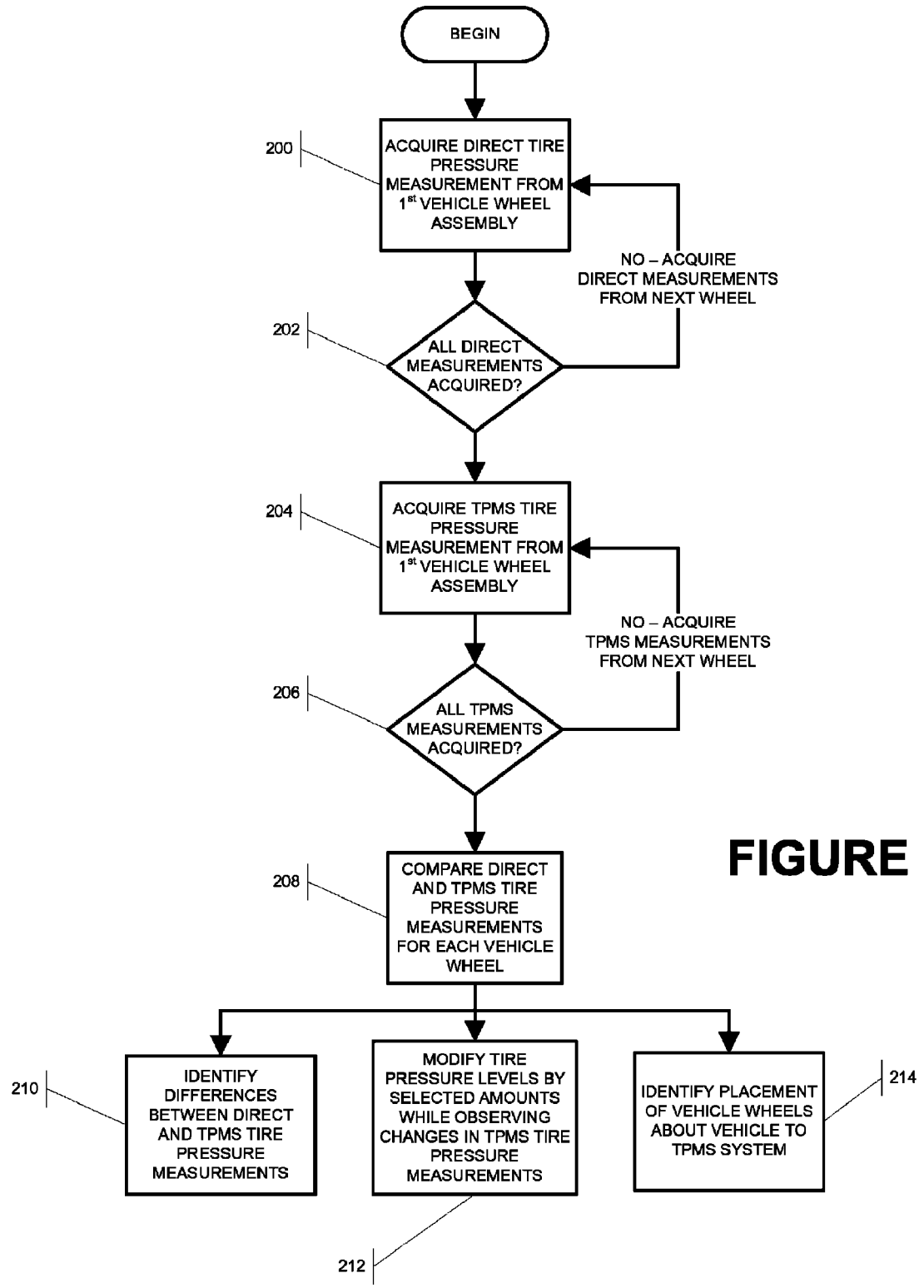

INTEGRATED TIRE PRESSURE DIAGNOSTIC SYSTEM AND METHOD

CROSS-REFERENCE TO RELATED APPLICATIONS

The present application is related to, and claims priority from, U.S. Provisional Patent Application Ser. No. 60/867,938 filed on Nov. 30, 2006, and which is herein incorporated by reference.

STATEMENT REGARDING FEDERALLY SPONSORED RESEARCH

Not Applicable.

BACKGROUND OF THE INVENTION

The present invention is related to vehicle service systems, and in particular, to vehicle service systems such as vehicle wheel alignment systems, which are configured to acquire measurements of tire pressure for a wheel assembly of a vehicle undergoing a service procedure directly and from a tire pressure monitoring system sensor, and to utilize the acquired tire pressure measurements during a vehicle service procedure, such as to carry out diagnostic evaluation of the tire pressure monitoring system.

Modern vehicle wheel assemblies on most motor vehicles today consist of a pneumatic tire mounted or seated on a wheel rim, such as shown in FIG. 1. The tire is secured to the wheel rim by forces exerted between the inner peripheral edges of the tire, i.e. the beads, and the mating surfaces of the wheel rim, i.e. the bead seats. Pressurized air contained within the toroidal volume defined between the tire and wheel rim supports the tire against the weight of the vehicle. Tire pressure monitoring systems associated with motor vehicles such as passenger cars and light trucks are designed to provide a warning to drivers if the pressure level of air within tire on the vehicle becomes significantly decreased during operation. There are two types of tire pressure monitoring systems currently in use. The first is an indirect system, which relies upon rotational speed measurements acquired by the vehicle anti-lock braking system sensors during vehicle operation. A tire which is significantly deflated relative to the remaining tires on the vehicle will have a smaller rolling radius, and therefore will rotate faster. Significant differences in vehicle wheel rotational speeds are interpreted as being indicative of an under-inflated tire by an indirect tire pressure monitoring system, and a suitable warning is provided to the vehicle operator. However, indirect tire pressure monitoring systems cannot identify small changes in tire pressures, and are incapable of identifying situations in which all of the vehicle wheels are under-inflated.

The second type of tire pressure monitoring system is a "direct" system, in which each wheel assembly of the vehicle is equipped with a tire pressure sensor disposed in an operative relationship to the pressurize air contained between the tire and wheel rim. For example, as is shown in FIG. 2, a tire pressure sensor may be strapped about the surface of the vehicle wheel rim, such that the tire pressure sensor is disposed within the volume defined by the tire about the wheel rim. Alternatively, as shown in FIG. 3, the tire pressure sensors may be coupled to, or associated with, the valve stem of the vehicle wheel assembly. Typically, tire pressure sensors are configured to transmit data using high-frequency radio waves in the preferred range of 300 MHz-450 MHz to a common control unit. Specific frequencies such as 303 MHz, 315 MHz, 418 MHz, 434 MHz, and optionally 868 MHz are generally employed by tire pressure monitoring systems currently in use. The common control unit is configured to process the received data and provide the operator with a suitable display of vehicle wheel tire pressures. An exemplary "direct" tire pressure monitoring system is manufactured and sold by Smartire Systems, Inc. of Richmond, Calif. These "direct" tire pressure monitoring systems, which are semi-permanently installed, should not be confused with the process of acquiring "direct" measurements of the pressure in a tire such as by manual or automatic use of an external tire pressure gauge temporarily coupled to the tire valve stem and removed after use.

To prevent cross-talk between tire pressure monitoring systems of nearby vehicles, each tire pressure sensor is configured to transmit a unique identification code together with the tire pressure data signal. Depending upon the configuration of the particular "direct" system, and the signal range, the tire pressure monitoring system may be utilized to further monitor pressure in a vehicle's spare tire, or pressure in the tires of a towed trailer.

To provide a vehicle operator with useful information regarding tire pressure levels, a "direct" tire pressure monitoring system must provide the operator with a means to identify which monitored tires have reduced tire pressure. Identifying the vehicle wheel location for each tire pressure sensor in a vehicle tire pressure monitoring system may be done manually or automatically. Manual systems require some form of operator interaction, such as by physically installing predetermined tire pressure sensors in tires positioned in predetermined locations about a vehicle. Alternatively, each tire pressure sensor can be identified by a unique indicator to the common control unit, for example, a color-coded marking on the tire valve stem. When a low tire pressure condition is detected by one of the tire pressure sensors, the control unit displays a corresponding color to the vehicle operator, requiring the operator to inspect the vehicle wheels to located the corresponding color marking. Manual systems often require the operator to retrain or reposition the tire pressure sensors following a vehicle wheel rotation or service, a time-consuming and error-prone procedure.

Alternatively, tire pressure monitoring systems may be configured to automatically identify the corresponding tire locations associated with each tire pressure sensor in the system. These "automatic" systems typically provide a trigger mechanism or signal to activate each tire pressure sensor's transmitter in a predetermined sequence. The unique identification associated with each transmitter is stored as it is received in the predetermined sequence, thereby associating each tire pressure sensor with a known tire location. For some systems, the tire pressure sensors include a magnetic switch which is activated or triggered by the proximity of a magnetic field to direct the tire pressure sensor to transmit the unique identification. Alternate systems incorporate a radio-frequency receiver into each of the tire pressure sensors. Each of the receivers responds to a specific trigger signal, typically around 125 MHz, to transmit the associated tire pressure sensor's unique identification. While the programming of an "automatic" system remains time consuming, the need to physically reposition each tire pressure sensor following a tire rotation or tire service is eliminated, saving significant time during a vehicle service procedure.

Still other tire pressure monitoring systems are fully automatic in terms of locating each of the tire pressure sensors associated with a vehicle. These systems typically employed radio-frequency antenna disposed in proximity to the vehicle wheels, and uniquely identify each individual tire pressure sensor by monitoring the strength of the signals emitted by each tire pressure sensor, specific antenna identification codes, or specific radio-frequency variations on the order of a few KHz, associated with each tire pressure sensor.

Measurements of tire pressure in the individual wheel assemblies of a vehicle undergoing a vehicle service procedure may be useful in determining vehicle measurements and/or the proper operation of a vehicle-mounted tire pressure monitoring system. Accordingly, it would be advantageous to provide a vehicle service system, such as a vehicle wheel alignment system, with the necessary functionality to acquire measurements of tire pressure for one or more wheels of a vehicle undergoing a vehicle service procedure. Additional benefit may be obtained by providing the vehicle service system with the necessary functionality to access stored data representative of tire pressure specifications associated with the wheel assemblies of a vehicle. This stored data may, for example, be stored in an accessible database, in a vehicle on-board control unit, or in a data storage device associated with the individual vehicle wheel assemblies.

It would further be advantageous to provide a vehicle service system, such as a vehicle wheel alignment system or a stand-alone tire service system, with the necessary functionality to detect the presence of an installed tire pressure monitoring system (TPMS) on a vehicle undergoing a vehicle service procedure, and to receive signals from the tire pressure monitoring system which are indicative of tire pressure and/or temperature measurements.

It would be further advantageous for a vehicle service system, such as a vehicle wheel alignment system, to carry out diagnostic and calibration functions associated with an installed tire pressure monitoring system (TPMS) on a vehicle undergoing a vehicle service procedure.

It would be further advantageous to provide an integrated vehicle service system that includes all items necessary to completely diagnose a complex TPMS/Tire Pressure system. Previous systems involved stand-alone hand-held tools or OEM scan tools and many manual tasks that could introduce errors or misinterpretations. A technician had to be specially trained how to use each hand-held tool and each OEM scan tool, and the nuances associated with each. Previous procedures often included removing the wheels before the TPMS system is checked, leading to customer complaints that the service shop damaged the TPMS devices. The various alternate embodiments of the present invention provide a vehicle service system which is configured for acquiring direct tire pressure measurements and for communication with the ECU of a vehicle to test the functionality and operation of the entire TPMS system of the vehicle. Previous hand-held systems do not typically check the ECU functionality in that system, but only the individual TPMS devices. Current procedures are labor intensive, cumbersome, and error-prone due to the limitations mentioned above.

BRIEF SUMMARY OF THE INVENTION

Briefly stated, the present disclosure provides a computer-based vehicle service system, such as a wheel alignment system, which is configured to acquire measurements of the air pressure in the tires of a vehicle undergoing a service procedure. The vehicle service system is further configured with a TPMS sensor to acquire tire pressure signals from individual TPMS devices installed in the tires. The system is adapted to compare the readings from the TPMS sensors with the acquired direct air pressure measurements for testing and diagnostic analysis of the TPMS sensors. Preferably, the vehicle service system is further configured to direct or control an increase or decrease in the air pressure of a tire while observing the signals from the TPMS sensors.

In an alternate embodiment, the computer-based vehicle service system, such as a wheel alignment system, is configured to acquire measurements of the air pressure in the tires of a vehicle, and to operatively communicate with an on-board control unit of the vehicle, to obtain TPMS information from the vehicle, either through a direct physical connection to the on-board control unit or via a wireless communications link. The tire pressure specifications for the vehicle may also be obtained by the vehicle service system, either from the on-board control unit, or from an accessible database of tire pressure settings. The vehicle service system is further configured to utilize the measured air pressure, the obtained TPMS information, and any acquired tire pressure specifications to perform diagnostic and calibration operations associated with the vehicle TPMS.

In an alternate embodiment, the vehicle service system, such as a vehicle wheel alignment system, is configured with a radio-frequency identification (RFID) interrogator to read and/or write information to an RFID tag associated with a tire or wheel assembly of a vehicle. Information obtained from the RFID tag may include tire pressure specifications, tire pressure limits, measurement histories, etc. This information can be used to determine a pressure at which to inflate the tire during a diagnostic/measurement procedure, or for proper driving conditions (at the end of the service procedure).

In an alternate embodiment, the vehicle service system is configured to provide instructions to an operator for moving the tires of a vehicle to alternate positions on the vehicle (i.e. a procedure commonly known as "rotating the tires", such that the left rear tire is moved to the left front position, etc.) and to subsequently communicate the altered placement of the individual vehicle wheel assemblies to a TPMS system associated with the vehicle, enabling the TPMS system to provide proper identification of individual tire pressure measurements.

In an alternate embodiment, the vehicle service system is configured to utilize ambient air temperature data to select a suitable range of air pressure for controlling or directing inflation of a vehicle wheel assembly. Ambient air temperature data is preferably representative of an average external air temperature encountered by the vehicle during normal driving conditions, and may be acquired by the vehicle service system through operator input, direct measurement, communication with a vehicle control unit, or through any other suitable external source.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 5 is a flow chart illustrating the steps in an exemplary method of the present invention.

Corresponding reference numerals indicate corresponding parts throughout the several figures of the drawings. It is to be understood that the drawings are for illustrating the concepts set forth in the present disclosure and are not to scale.

DESCRIPTION OF THE PREFERRED EMBODIMENT

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

In a first embodiment, the present disclosure provides a computer-based vehicle service system 100, such as a wheel alignment system or a dedicated tire pressure analysis system, which is configured with a suitable or supplemental sensor 102 adapted to acquire direct measurements of the air pressure in one or more of the tires of a vehicle undergoing a service procedure. The sensor 102 may be of any conventional design intended to provide a signal representative of a measure of air pressure, and may be operatively coupled to a processor 104 of the vehicle service system 100 via a communications cable or via a wireless communications link 106. For example, a hand-held wireless tire pressure gauge may be utilized by a service technician to acquire a tire pressure measurement by operatively coupling the gauge to the valve stem of a vehicle wheel assembly, or a pressure gauge may be associated with an air supply system for pressurizing the tires. The acquired measurement is then communicated to the vehicle service system 100 via a suitable wireless communications link, such as 106.

Figure 1:
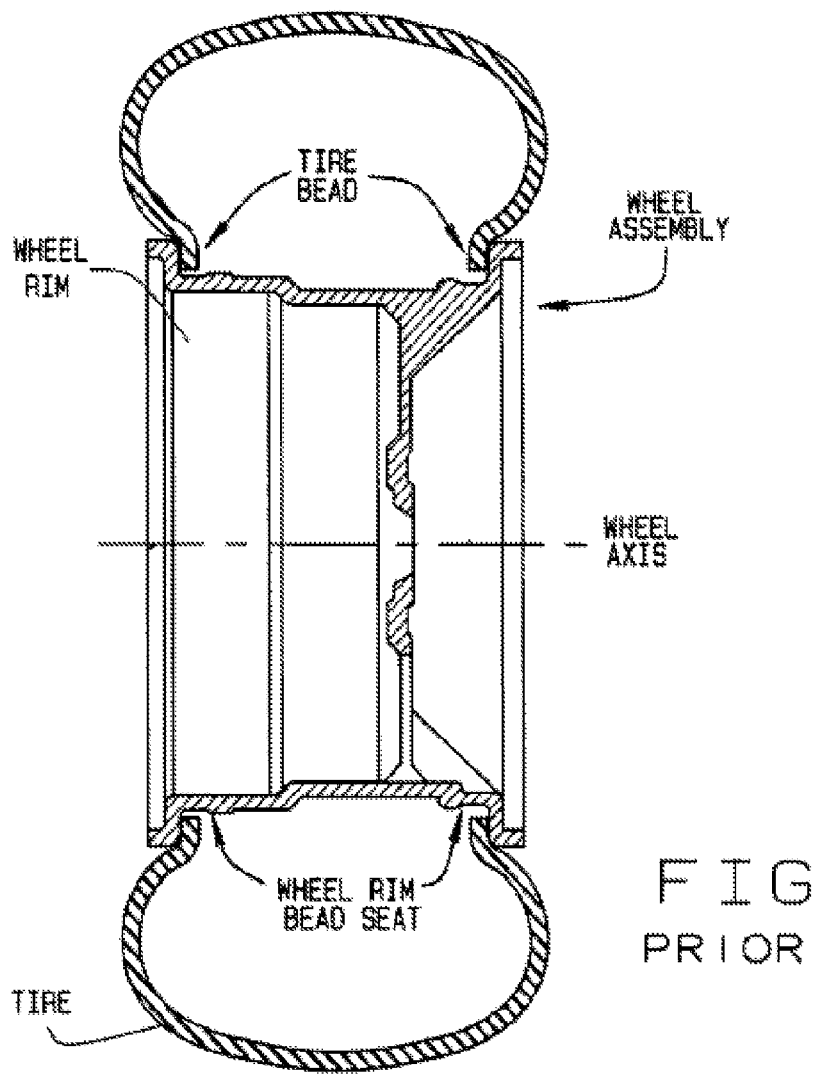
FIG. 1 is a prior art cross-sectional view of a vehicle wheel assembly, illustrating a tire seated about a wheel rim.
Figure 3:
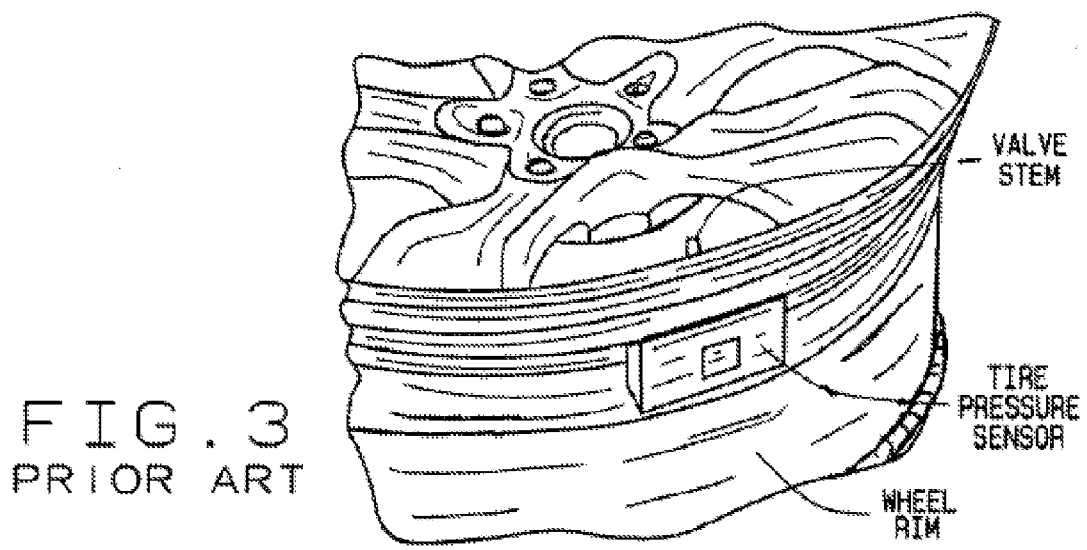
FIG. 3 is a perspective view of a vehicle wheel rim having a prior art tire pressure sensor operatively coupled to a wheel assembly valve stem.
Figure 2:
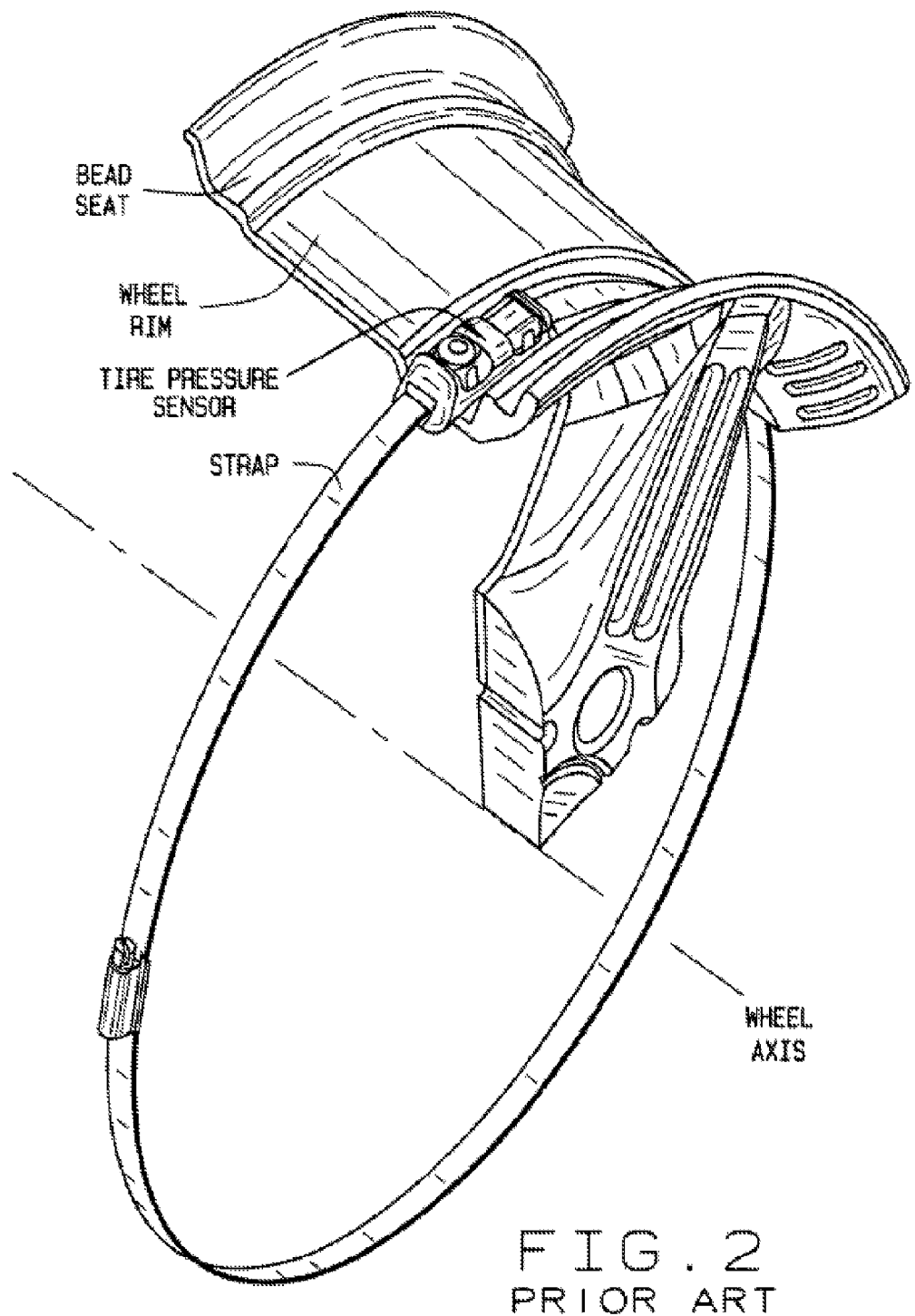
FIG. 2 is a perspective partial sectional view of a prior art tire pressure sensor of a tire pressure monitoring system secured about a vehicle wheel rim surface.
Figure 4:
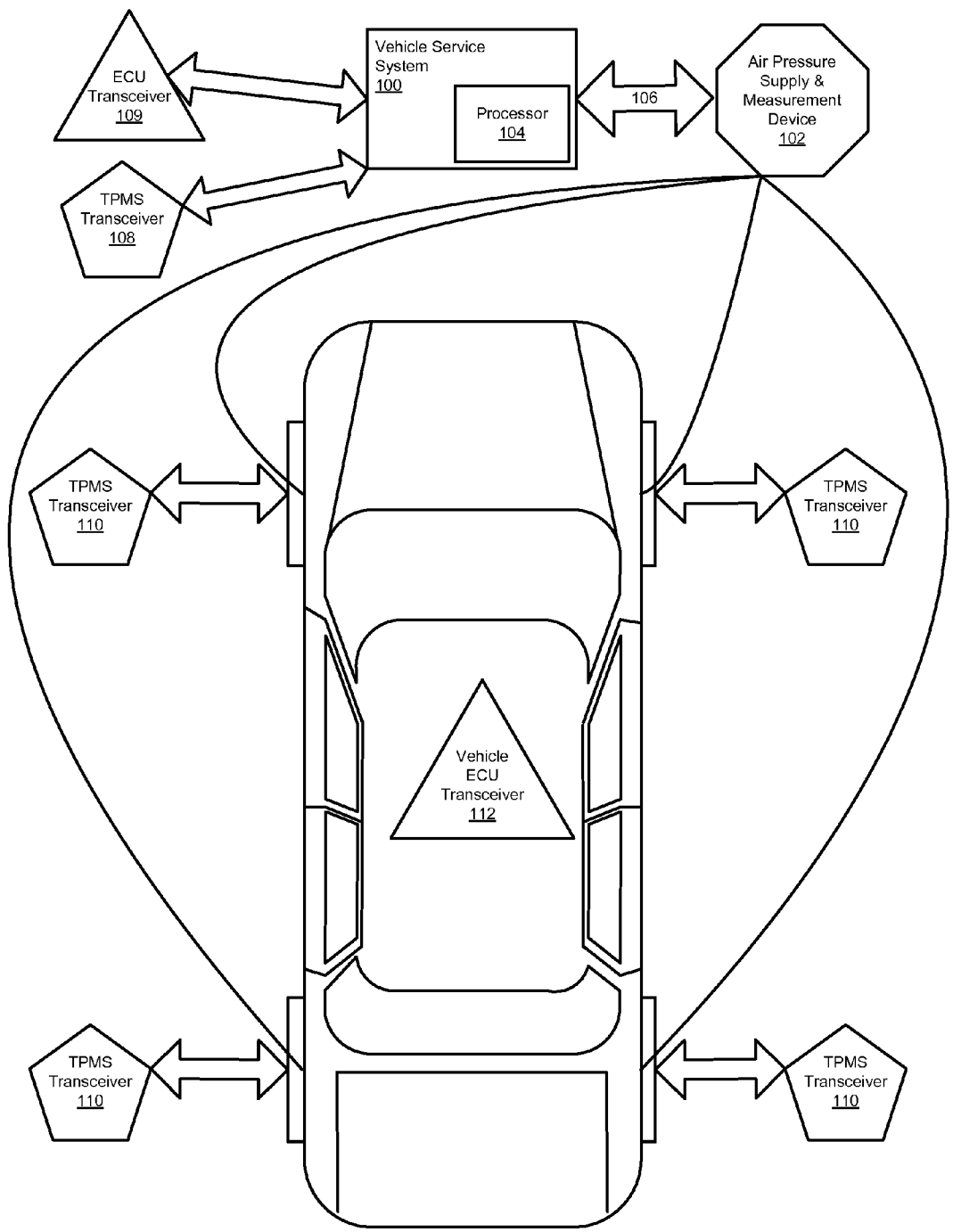
FIG. 4 is an illustration of an exemplary configuration of a vehicle service system of the present invention.

Preferably, the vehicle service system 100 is additionally configured with a Tire Pressure Monitoring System (TPMS) sensor or interface 108 to acquire data signals from installed TPMS devices 110 in the individual tires or wheel assemblies of the vehicle. These data signals may be acquired directly from the individual TPMS sensors 110 by the interface 108, or may be acquired by an ECU transceiver 109, indirectly by communication with a vehicle control unit 112 which is in turn in communication with the individual TPMS sensors 110. As shown in FIG. 4, the vehicle service system 100 may then compare readings for each vehicle wheel acquired from the TPMS sensors 110 with the air pressure direct measurements acquired from the supplemental sensors 102, enabling diagnostic analysis of the operation of the installed TPMS devices 110. The vehicle service system 100 is optionally configured to test and calibrate installed TPMS devices 110 by directing an operator to increase or decrease the air pressure in an individual vehicle wheel assembly and observing the resulting changes in signals from the associated TPMS sensor 110, by identifying differences between the direct and TPMS measurements, and to assist in identifying placement location for vehicle wheel assemblies about the vehicle. Those of ordinary skill in the art will recognize that this procedure may be completed in an automated fashion by the vehicle service system 100 by providing suitable connections to a controlled source of air pressure 102 for a wheel assembly undergoing testing.

In one exemplary method shown in FIG. 5, for diagnostic analysis of an installed TPMS sensor 110, the vehicle service system 100 first acquires a direct measurement of the air pressure in a selected tire (Box 200). After each direct measurement is acquired (Box 202), a corresponding measurement from a TPMS sensor 110 installed in each tire undergoing analysis is acquired (Box 204). This process is repeated for each wheel assembly undergoing analysis (Box 206). Those of ordinary skill in the art will recognize that the order in which the direct measurements and the TPMS sensor measurements are acquired may be varied without departing from the scope of the disclosure.

Once all measurements have been acquired, the vehicle service system 100 may compare (Box 208) the direct measurements (Box 200) with the TPMS measurements (Box 204) for each wheel assembly as part of a diagnostic procedure. The results of the comparison may be used to identify differences between the direct and TPMS measurements (Box 210), to direct modifications to the air pressure in a selected wheel assembly while observing changes in TPMS measurements for that wheel assembly (Box 212), or to assist in identifying the placement of the wheel assemblies about a vehicle (Box 214).

For example, when the vehicle service system 100 may direct the air pressure in a selected tire to be reduced to a point at or below that at which the TPMS sensor 110 is designed to provide a low tire pressure warning. Output from the TPMS sensor 110 is monitored by the processor 104 in conjunction with the direct measurements of tire air pressure (Box 200) to identify an actual air pressure level at which the TPMS sensor 110 provides the low tire pressure warning. If the low tire pressure warning is not provided, or is provided at an incorrect air pressure for the selected tire, the vehicle service system 100 may be configured to provide a suitable fault indication to an operator, allowing corrective action to be taken, such as recalibration of the TPMS sensor 110 or replacement of a defective unit.

To enable a vehicle wheel alignment system of the present invention to detect the presence of a tire pressure monitoring system sensor in a vehicle wheel assembly, the vehicle service system may optionally be configured with a tire pressure sensor detection system or transceiver 108 which is configured to transmit a short range "trigger" signal in the immediate vicinity of the vehicle wheel alignment system, such that a tire pressure sensor 110 disposed within a wheel assembly on a vehicle undergoing an alignment or service procedure will respond by emitting a detectable signal. Preferably, the tire pressure sensor detection system 108 is configured with a radio-frequency transceiver adapted to transmit a radio-frequency "trigger" signal at the appropriate radio-frequency for at least one brand of tire pressure sensor, as well as to receive responsive radio-frequency signals. Optionally, the tire pressure sensor detection system 108 may include an electromagnetic trigger adapted to generate a magnetic field trigger signal in proximity to the wheel assembly, as required by alternate brands of tire pressure sensors 110.

Those of ordinary skill in the art will recognize that the tire pressure sensor detection system 108 may be configured to transmit suitable "trigger" signals for a wide variety of tire pressure sensors available from different manufacturers, and as such, may be configured with a variety of components adapted to emit and detect the appropriate radio-frequency and/or magnetic signals to and from the tire pressure sensors 110. Such components are not be limited to radio-frequency transceivers and electro-magnetic triggers as described herein, but may encompass any of a variety of trigger means and signal receivers as necessary to detect a selected brand of tire pressure sensor 110.

Similarly, those of ordinary skill in the art will recognize that the tire pressure sensor detection system 108 is not limited to an embodiment as a hardware component separate and distinct from the processing unit 104 of the vehicle wheel alignment system 100, but may be implemented as a software module operating within the processing unit 104 to control the associated signal transceiver components.

In an alternate embodiment, the vehicle service system 100, such as a wheel alignment system, or a dedicated tire pressure analysis system, is configured to acquire measurements of the air pressure in the tires of a vehicle, either directly using a supplemental air pressure sensor and indirectly by communicating with an on-board control unit (ECU) of the vehicle to obtain TPMS information, either through a direct physical connection to the on-board control unit 112 or via a wireless communications link and interface 109. Optionally, tire pressure specifications for the particular vehicle undergoing service may also be obtained by the vehicle service system 100, either from the on-board control unit 112, or from an accessible database of tire pressure settings. The vehicle service system 100 may be further configured to utilize direct measurements of air pressure, the obtained TPMS information, and any acquired tire pressure specifications to perform diagnostic and calibration operations associated with the vehicle TPMS.

In an alternate embodiment, the vehicle service system 100, such as a vehicle wheel alignment system, or a dedicated tire pressure analysis system, is configured with a radio-frequency identification (RFID) interrogator to read and/or write information to an RFID tag associated with a tire or wheel assembly of a vehicle. Information obtained from, and stored in, the RFID tag may include tire pressure specifications, tire pressure limits, tire pressure measurement histories, etc. This information may be used by the vehicle service system to determine a pressure at which to inflate the tire during a diagnostic/measurement procedure, or for proper driving conditions (at the end of the service procedure).

In an alternate embodiment (Box 214), the vehicle service system 100 may be configured to provide instructions to an operator for moving the tires of a vehicle to alternate positions on the vehicle (i.e. a procedure commonly known as "rotating the tires", such that the left rear tire is moved to the left front position, etc.) and to subsequently communicate the altered placement of the individual vehicle wheel assemblies to a TPMS system associated with the vehicle, enabling the TPMS system to provide proper identification of individual tire pressure measurements during vehicle operation.

In an alternate embodiment, the vehicle service system 100 may be configured to direct the inflation of tires of a vehicle to a suitable air pressure. The air pressure may be monitored during the inflation processing either by direct measurements of the tire air pressure at a pressure source 102, or by receiving signals communicated from an installed TPMS sensor 110. The received signals may be communicated directly to the vehicle service system 100, or may be acquired by the vehicle service system 100 through communication with a vehicle control unit 112 as previously described. The vehicle service system 100 may optionally be configured to utilize ambient air temperature data. Preferably, the ambient air temperature data is provided by an operator to the vehicle service system 100, and is representative of the expected ambient air temperature within which the vehicle will be normally operated. Utilizing the ambient air temperature data, the vehicle service system 100 is optionally configured to accommodate variations in air density due to temperature when directing the inflation of the tires versus the air density due to temperature when the vehicle is driven. This is particularly useful to avoid under-inflation of tires on vehicles which are operated in cold environments, or over-inflation of tires on vehicles which are operated in hot environments.

Those of ordinary skill in the art will recognize that the concepts and methods presented herein are not limited to use with vehicle wheel alignment systems. For example, a means to acquire direct tire pressure measurements as well as to interrogate installed TPMS sensors 110 on a vehicle may be incorporated into a vehicle lift rack system, and is particularly well suited for use with a pneumatically actuated and computer controlled vehicle lift rack system. Pneumatically actuated vehicle lift rack systems by design already incorporate many of the components 102 required for measuring and regulating the air pressure in the vehicle wheels, and may be adapted to communicate tire pressure measurements and TPMS sensor analysis data with other vehicle service devices, such as vehicle wheel alignment systems.

The present disclosure can be embodied in-part in the form of computer-implemented processes and apparatuses for practicing those processes. The present disclosure can also be embodied in-part the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. An improved vehicle wheel alignment measurement system having a processing system configured with at least one vehicle wheel alignment measurement software application, and at least one sensor operatively coupled to the processing system for acquiring data utilized to determine at least one vehicle measurement, the improvement comprising:

an external tire pressure measurement gauge operatively coupled to the processing system, said tire pressure measurement gauge configured to directly measure inflation pressure within a wheel assembly of a vehicle via a temporary connection to a valve stem of the wheel assembly;

a tire pressure monitoring system interface in the vehicle wheel alignment measurement system operatively coupled to the processing system, said tire pressure monitoring system interface configured to receive at least one tire pressure measurement from at least one tire pressure monitoring system sensor disposed within said wheel assembly of a vehicle;

wherein said tire pressure monitoring system interface is configured to communicate said received at least one tire pressure measurement to the processing system;

wherein the processing system is further configured to compare said direct measure of said tire inflation pressure with said communicated tire pressure measurement received from said tire pressure monitoring system interface to identify a difference there between; and wherein said tire pressure monitoring system interface is configured to identify a defective tire pressure monitoring system sensor disposed in a wheel assembly of a vehicle in response to an identification of said difference exceeding a selected threshold.

2. The improved vehicle wheel alignment measurement system of claim 1 wherein the processing system is configured to direct an alteration of a tire pressure in said wheel assembly in response to said communicated tire pressure measurement.

3. The improved vehicle wheel alignment measurement system of claim 1 further including a radio-frequency identification (RFID) interrogator.

4. The improved vehicle wheel alignment measurement system of claim 1 wherein the tire pressure monitoring system interface is configured to acquire said at least one tire pressure measurement via a wireless communication link to an electronic control unit of said vehicle.

5. The improved vehicle wheel alignment measurement system of claim 4 wherein the processing system is further configured to determine an operational status of either a tire pressure monitoring system associated with said vehicle or at least one tire pressure sensor associated with said vehicle.

6. The improved vehicle wheel alignment measurement system of claim 1 wherein the processing system is further configured to facilitate pressure measurement calibration of at least one tire pressure monitoring sensor associated with said vehicle by monitoring air pressure measurements received directly from the external tire pressure measurement gauge in response to a selected change in tire inflation pressure for comparison with corresponding measurements of said selected change received at the tire pressure monitoring system interface.

7. The vehicle wheel alignment measurement system of claim 1 wherein said processor is further configured to receive air temperature data; and wherein said processor is further configured to utilize said received air temperature data to direct a change in air pressure in said vehicle wheel assembly.

8. The vehicle wheel alignment measurement system of claim 7 wherein said air temperature data is representative of an expected ambient air temperature range for normal vehicle operations.

9. The vehicle wheel alignment measurement system of claim 7 wherein said air temperature data is received from said tire pressure monitoring system sensor.

10. The vehicle wheel alignment measurement system of claim 1 wherein said processor is further configured to direct a change in air pressure in said vehicle wheel assembly.

11. A method for tire pressure monitoring in a vehicle wheel alignment measurement system having a processing system configured with at least one vehicle wheel alignment measurement software application, and at least one sensor operatively coupled to the processing system for acquiring data utilized to determine at least one vehicle measurement, comprising:

communicating, to the processing system via a tire pressure monitoring system interface, at least one tire pressure measurement acquired by at least one tire pressure monitoring system sensor disposed within a wheel assembly of a vehicle;

acquiring at the processing system, a direct measurement of the tire pressure at said wheel assembly of the vehicle from an external tire pressure measurement gauge operatively coupled to the processing system, and which is configured to directly measure inflation pressure within a wheel assembly of a vehicle via a temporary connection to a valve stem of the wheel assembly; and comparing said direct measurement of said tire pressure with said communicated tire pressure measurement received from said tire pressure monitoring system interface, wherein a difference exceeding a selected threshold is identified; and identifying a defective tire pressure monitoring system sensor responsive to said comparison of said direct measurement and said communicated tire pressure measurement.

12. The method of claim 11 further including the steps of altering said tire pressure in said wheel assembly of the vehicle; and monitoring, during said step of altering said tire pressure, changes in said direct measurement of said tire pressure from said external tire pressure measurement gauge together with changes in said communicated measure of said tire pressure from said tire pressure monitoring system sensor.

13. A vehicle wheel alignment measurement system having a processing system configured with at least one vehicle wheel alignment measurement software application, and at least one wheel alignment sensor operatively coupled to the processing system for acquiring data utilized to determine at least one vehicle measurement, comprising:

wherein the processing system is configured to receive measurements of tire pressure within at least one vehicle wheel assembly from at least two independent measurement means;

wherein the processing system is configured to compare said received measurements of tire pressure and to identify a difference between tire pressure measurements from said independent measurement means;

wherein said processing system is configured to identify a defective independent measurement means responsive to said difference exceeding a threshold;

wherein said processing system is further configured to direct a change in pressure for said vehicle wheel assembly while observing corresponding changes in said received measurements from a non-defective independent measurement means; and wherein said processing system is further configured to calibrate the pressure measurements from said non-defective independent measurement means using said observed changes in said received pressure measurements.

14. The vehicle wheel alignment measurement system of claim 13, wherein at least one of said independent measurement means is a tire pressure measurement system sensor associated with said vehicle wheel assembly; and wherein at least one of said independent measurement means is an air pressure gauge removably fitted to a valve stem of the vehicle wheel assembly.

15. The vehicle wheel alignment measurement system of claim 13, wherein said processing system is configured to compare said received measurements with a tire pressure specification value during a vehicle service procedure to alter said tire pressure within said vehicle wheel assembly.

* * * * *